(12) United States Patent
Ståhl et al.

(10) Patent No.: US 11,316,820 B2
(45) Date of Patent: Apr. 26, 2022

(54) REGISTRATION OF DATA PACKET TRAFFIC FOR A WIRELESS DEVICE

(71) Applicant: Telefonaktiebolaget LM Ericsson (publ), Stockholm (SE)

(72) Inventors: Per Ståhl, Klagshamn (SE); John Fornehed, Sollentuna (SE); Ari Keränen, Helsinki (FI); Anders Nohlgren, Solna (SE); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 79 days.

(21) Appl. No.: 16/091,242

(22) PCT Filed: Apr. 14, 2016

(86) PCT No.: PCT/EP2016/058268
§ 371 (c)(1),
(2) Date: Oct. 4, 2018

(87) PCT Pub. No.: WO2017/178054
PCT Pub. Date: Oct. 19, 2017

(65) Prior Publication Data
US 2019/0158453 A1    May 23, 2019

(51) Int. Cl.
*H04L 29/00* (2006.01)
*H04L 61/103* (2022.01)
(Continued)

(52) U.S. Cl.
CPC ............ *H04L 61/103* (2013.01); *H04L 12/14* (2013.01); *H04L 61/6004* (2013.01);
(Continued)

(58) Field of Classification Search
CPC . H04L 61/103; H04L 63/083; H04L 63/0245; H04L 63/126; H04L 61/6059;
(Continued)

(56) References Cited

U.S. PATENT DOCUMENTS 8,295,830 B1 * 10/2012 Faccin ................ H04L 65/1016
455/432.1
2006/0067344 A1 * 3/2006 Sakurai ............... H04L 12/2854
370/401

(Continued)

FOREIGN PATENT DOCUMENTS

WO    2015139887 A1    9/2015

OTHER PUBLICATIONS

Shelby, Z., "The Constrained Application Protocol (CoAP)", Internet Engineering Task Force (IETF), Request for Comments 7252, Jun. 1, 2014, pp. 1-97, IETF (Year: 2014).*

(Continued)

*Primary Examiner* — Jeffrey C Pwu
*Assistant Examiner* — Helai Salehi
(74) *Attorney, Agent, or Firm* — Sage Patent Group

(57) ABSTRACT

There is provided mechanisms for handling registration of data packet traffic for a wireless device in a communications network. A method is performed by a core network node. The method comprises registering an amount of data packet traffic in the communications network for the wireless device, wherein each data packet comprises an address of the wireless device, wherein the address is mapped to an identity of the wireless device, wherein the address comprises a first part defining an identity of a local network gateway of the wireless device and a second part defining the identity of the wireless device, and wherein selection of the second part is independent from the first part and the identity of the local network gateway. The method comprises map- (Continued)

ping the amount of data packet traffic to the identity of the wireless device. The method comprises reporting the amount of data packet traffic and information identifying at least an identity of a group of wireless devices to which the wireless device belongs to a metering entity in the communications network.

15 Claims, 6 Drawing Sheets

(51) Int. Cl.
| | |
|---|---|
| H04L 101/604 | (2022.01) |
| H04M 15/00 | (2006.01) |
| H04W 4/24 | (2018.01) |
| H04W 12/06 | (2021.01) |
| H04L 12/14 | (2006.01) |
| H04L 29/06 | (2006.01) |
| H04L 101/622 | (2022.01) |
| H04L 101/659 | (2022.01) |

(52) U.S. Cl.
CPC ........ *H04L 63/0245* (2013.01); *H04L 63/083* (2013.01); *H04L 63/126* (2013.01); *H04M 15/8214* (2013.01); *H04W 4/24* (2013.01); *H04W 12/06* (2013.01); *H04L 61/6022* (2013.01); *H04L 61/6059* (2013.01)

(58) Field of Classification Search
CPC ............. H04L 61/6022; H04L 61/6004; H04L 9/3213; H04L 9/3268; H04M 15/8214; G06F 21/33
See application file for complete search history.

(56) References Cited

U.S. PATENT DOCUMENTS

| | | |
|---|---|---|
| 2008/0120707 A1 | 5/2008 | Ramia |
| 2013/0343231 A1 | 12/2013 | Foti |
| 2015/0163365 A1 | 6/2015 | Qiu et al. |
| 2015/0312758 A1 | 10/2015 | Redofrd |
| 2016/0037328 A1* | 2/2016 | Raveendran ............ H04W 8/08 370/328 |

OTHER PUBLICATIONS

3rd Generation Partnership Project, "3rd Generation Partnership Project; Technical Specification Group Services and System Aspects; Policy and charging control architecture (Release 13)", Technical Specification, 3GPP TS 23.203 VI 3.7.0, Mar. 1, 2016, pp. 1-242, 3GPP (Year: 2016).*

Kent, S. et al., IP Authentication header, Network Working Group, Request for Comments 4302, Dec. 1, 2005, pp. 1-30, The Internet Society.

Shelby, Z., "The Constrained Application Protocol (CoAP)", Internet Engineering Task Force (IETF), Request for Comments 7252, Jun. 1, 2014, pp. 1-97, IETF.

Farrell, S. et al., "Naming Things with Hashes", Internet Engineering Task Force (IETF), Request for Comments 6920, Apr. 1, 2013, pp. 1-20, IETF.

Aura, T., "Cryptographically Generated Adresses (CGA)", Network Working Group, Request for Comments: 3972, Mar. 1, 2005, pp. 1-22, The Internet Society.

Hinden, R., et al., "Internet Protocol Version 6 (IPv6) Addressing Architecture", Network Working Group, Request for Comments: 3513, Apr. 1, 2003, pp. 1-26, The Internet Society.

ZTE, "Considerations on the working scope of R14 feD2D", 3GPP TSG-RAN WG2, Meeting #93bis, Dubrovnik, Croatia, Apr. 11, 2016, pp. 1-5, R2-162402, 3GPP.

Nokia Networks, "Providing QoS in UE-to-NW Relay Scenario", SA WG2 Temporary Document, SA WG2 Meeting #110AH, Sophia Antipolis, France, Aug. 31, 2015, pp. 1-9, S2-152838, 3GPP.

Ericsson, "UE-to-netowrk relay PCC handling over Rx", Change Request, 3GPP TSG-CT WG3 Meeting #84, Jeju Island, South Korea, Feb. 15, 2016, pp. 1-7, C3-160125, 3GPP.

Kim, J. et al., "An ID/Locator Separation-Based Mobility Management Architecture for WSNs", IEEE Transaction on Mobile Computing, vol. 13, No. 10, Oct. 1, 2014, pp. 2240-2254, IEEE.

3rd Generation Partnership Project, "3rd Generation Partnership Project; Technical Specification Group Services and System Aspects; Policy and charging control architecture (Release 13)", Technical Specification, 3GPP TS 23.203 V13.7.0, Mar. 1, 2016, pp. 1-242, 3GPP.

Hinden, R. et al., "IP version 6 Addressing Architecture", Network Working Group, Request for Comments 4291, Feb. 1, 2006, pp. 1-25, The Internet Society.

Markman, T., "Securing Communications in the Internet of Things using ID-based Cryptography and Modern Elliptic Curves", Master Thesis, Faculty of Engineering and Computer Science, Department of Computer Science of Hamburg University of Applied Sciences, Aug. 26, 2015, pp. 1-86.

Open Mobile Alliance, "Lightweight Machine to Machine Technical Specification", Approved Version 1.0, Feb. 8, 2017, pp. 1-138, OMA.

Office Action issued in corresponding EP Application No. 16716561.2 dated Mar. 2, 2020, 06 Pages.

* cited by examiner

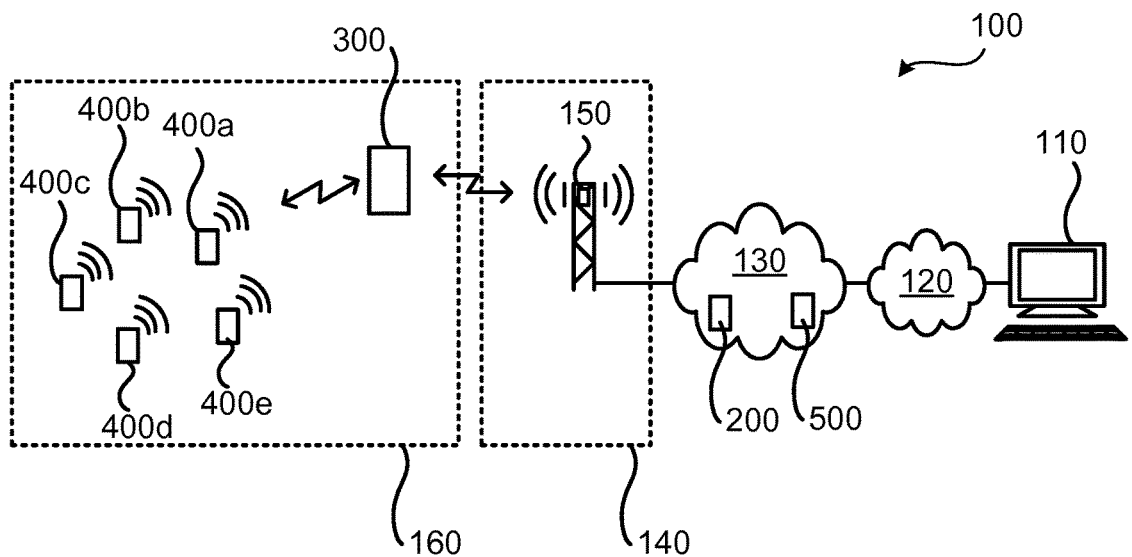
Fig. 1
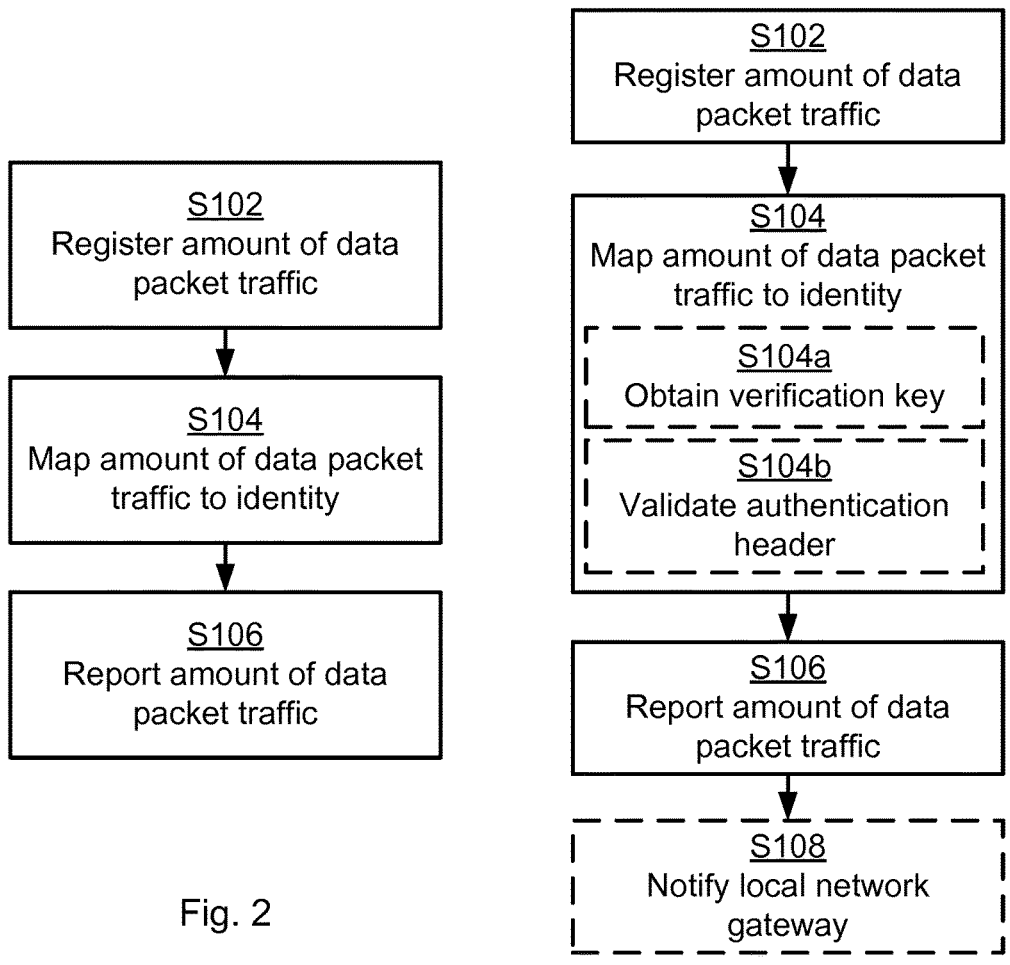
Fig. 2
Fig. 3

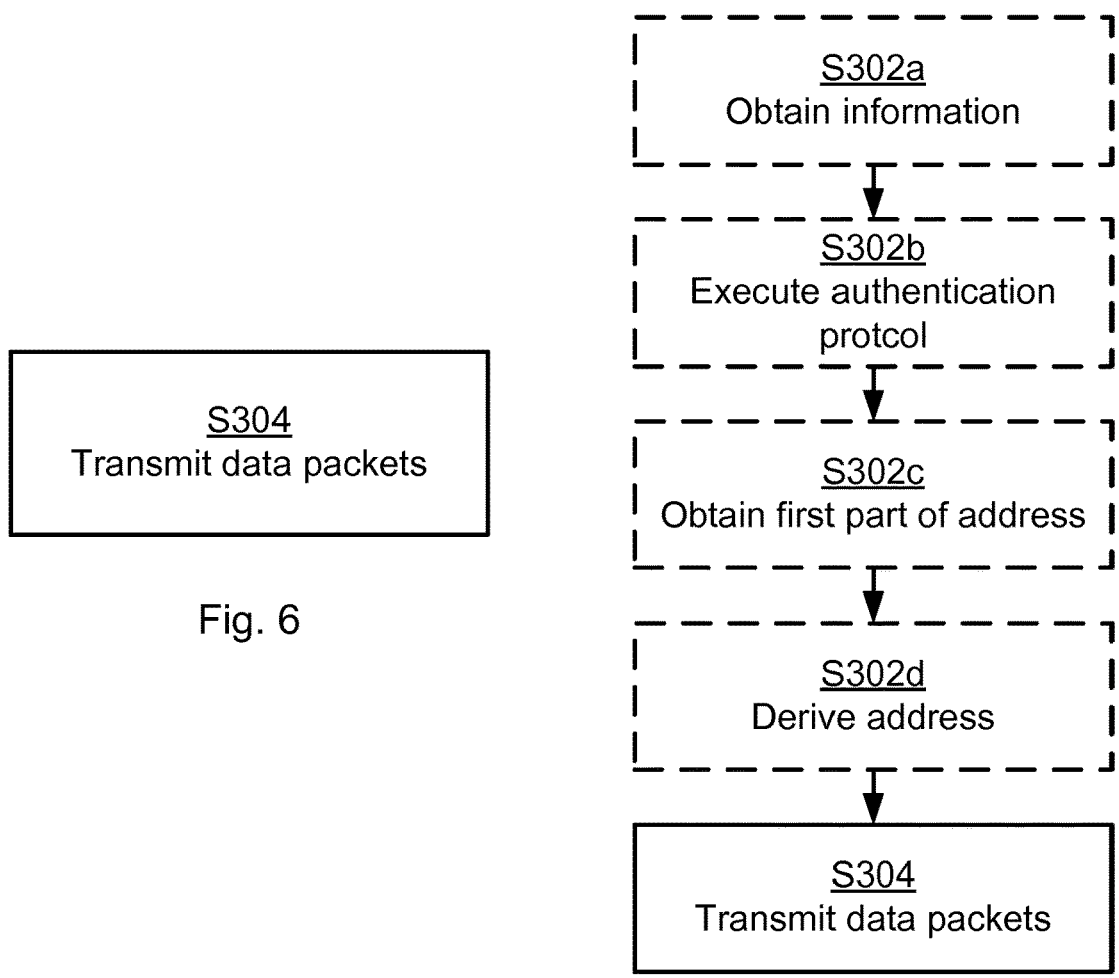
Fig. 6
Fig. 7
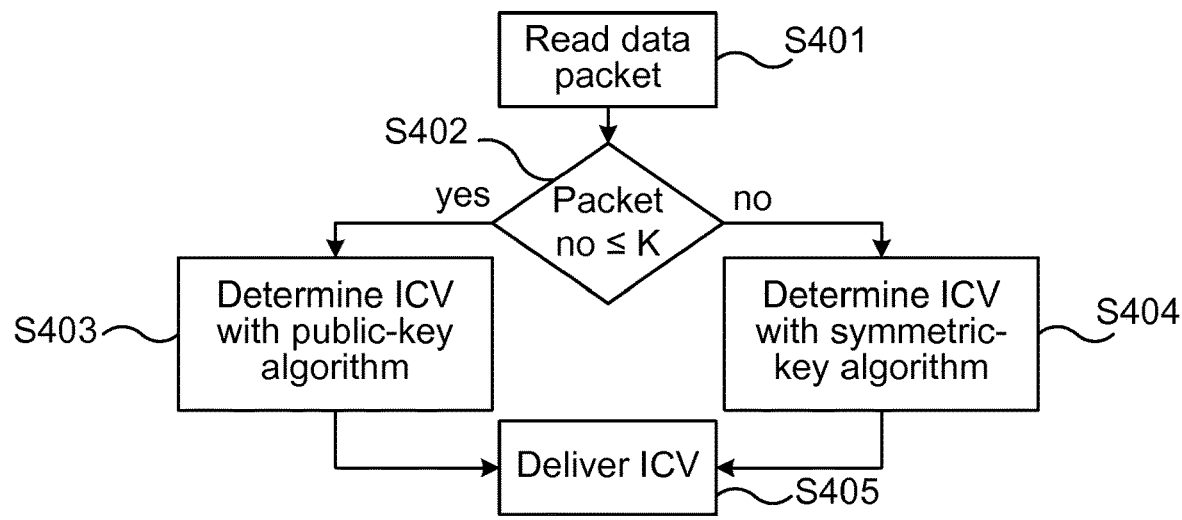
Fig. 8

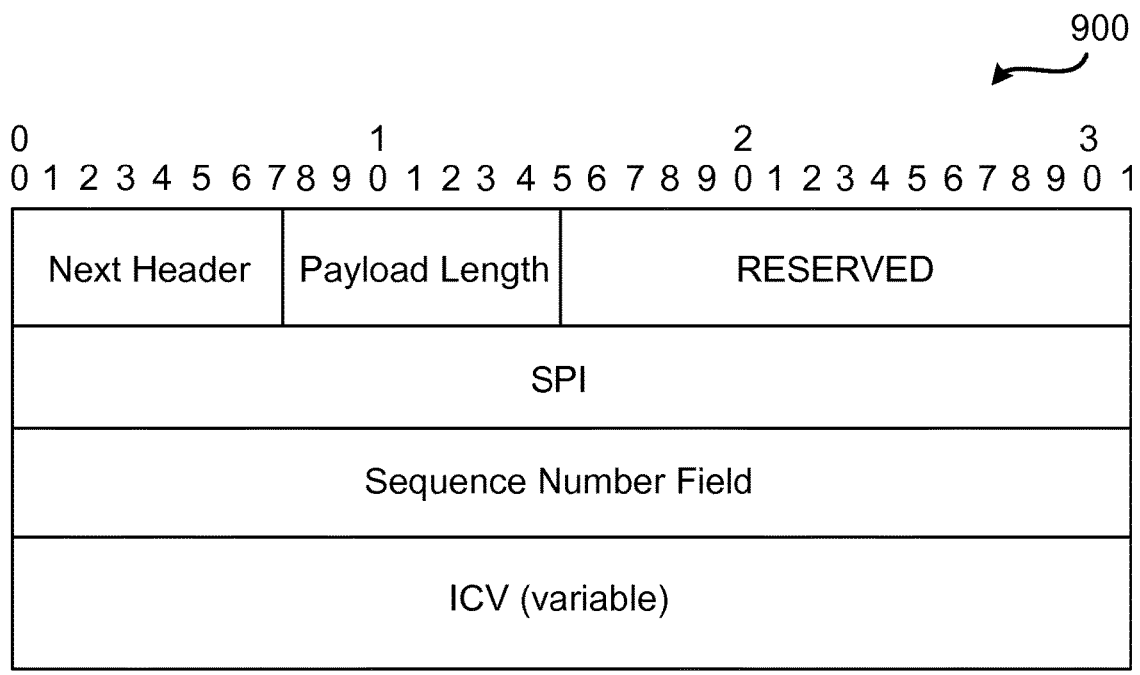
Fig. 9
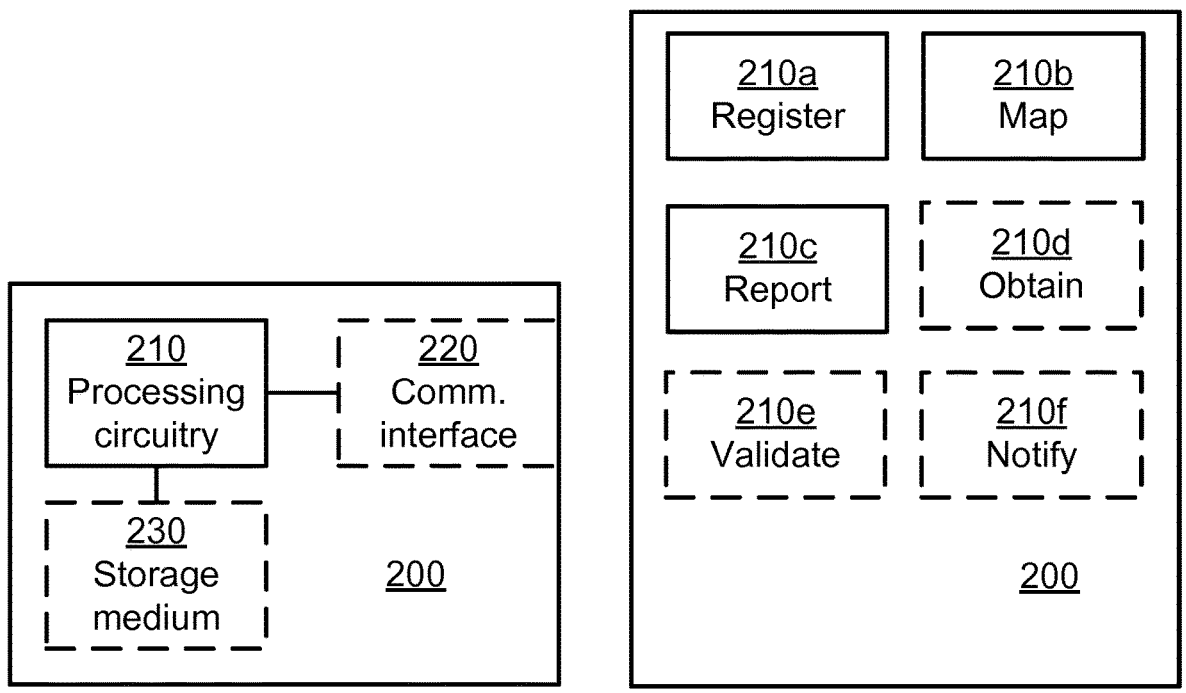
Fig. 11
Fig. 12

REGISTRATION OF DATA PACKET TRAFFIC FOR A WIRELESS DEVICE

TECHNICAL FIELD

Embodiments presented herein relate to a method, a core network node, a computer program, and a computer program product for handling registration of data packet traffic for a wireless device in a communications network. Further embodiments presented herein relate to a method, a local network gateway, a computer program, and a computer program product for facilitating handling of registration of data packet traffic for a wireless device in a communications network. Further embodiments presented herein relate to a method, a wireless device, a computer program, and a computer program product for facilitating handling of registration of data packet traffic for a wireless device in a communications network.

BACKGROUND

In communications networks, there may be a challenge to obtain good performance and capacity for a given communications protocol, its parameters and the physical environment in which the communications network is deployed.

For example, one feature in many communications networks is the ability to charge the subscriber of the subscriber identity module (SIM) card for the network resources and services consumed by the device comprising the SIM card. When a SIM card is comprised in a device that belongs to a (human) user, the process of billing the user for the consumed network resources and services involves keeping track of the amount of consumed network resources and services in a charging entity and translating the amount of consumed network resources and services to a bill that is sent to the user.

Many envisioned Internet of Things (IoT) scenarios involve using a local network gateway (LGW) with cellular connectivity, i.e., a gateway device that has short-range radio connectivity to a set of IoT devices and has a (at least partly) wireless network connection to the Internet. The IoT devices are thereby provided network access.

It is envisioned that one single local network gateway can provide network access for more than one IoT device. It is further envisioned that one single local network gateway can provide network access for IoT devices belonging to more than one user, such as to IoT devices belonging to at least two enterprises.

According to an exemplary scenario, assume that user A provides local network gateways that offer network access to devices in a limited geographical area. The devices connect to the local network gateways via a short-range or mid-range radio. The local network gateways connect to a cloud server via a wide area communications network. The local network gateways thus need to connect to the wide area communications network. Using cellular network access is one alternative. For the above scenario, the role of a Mobile Network Operator (MNO) could be that user A needs mobile network connectivity for their network of local network gateways. User A needs to manage the network of local network gateways, e.g. manage ways to control local network gateway selection by the devices.

Assume further that user B and user C are also in need to connect devices in the same limited geographical area, without providing their own local network gateways. User A can provide network access for the devices of user B and user C by providing connectivity to the local network gateways belonging to user A. User A then needs network access control of devices from user B and user C that connect to the network of local network gateways belonging to user A. User A needs a way to invoice user B and user C for usage of network resources and services through the local network gateways belonging to user A. An alternative role of the MNO could be that user A outsources the complete management and re-selling of access to the network of local network gateways to the MNO.

SIM cards have a shared secret that when the SIM card is inserted in the device allows communications networks to securely identify the user and device combination. The shared key and the associated identified international mobile subscriber identity (IMSI) serve as the identity of the user and device combination. However, many IoT devices do not have any such identity.

Instead, a cryptographic asymmetric key pair can be used as an identity for a device, such as an IoT device, by provisioning the public key (or a shorter presentation of it, such as a one-way hash fingerprint of the key) to the communications network and requiring the device to prove the ownership of the private key by signing some data (e.g., a challenge from the communications network) with the private key. A cryptographic asymmetric key pair can also be used to generate part of an Internet Protocol version 6 address (IPv6 address).

When a local network gateway is used to provide Internet connection to a set of devices, for the wide area network all the connections simply appear to originate from the local network gateways if they use the same IPv6 address prefix since the suffix part of the IPv6 address has no specific meaning for the wide area network. In the case of the local network gateway serving devices from different users the network operator would for billing purpose like to distinguish traffic for different users such that separate billing based on the amount of data that is sent can be achieved.

Hence, there is a need for an improved way of distinguish traffic from devices for different users.

SUMMARY

An object of embodiments herein is to provide efficient ways of distinguish traffic from devices for different users.

According to a first aspect there is presented a method for handling registration of data packet traffic for a wireless device in a communications network. The method is performed by a core network node. The method comprises registering an amount of data packet traffic in the communications network for the wireless device, wherein each data packet comprises an address of the wireless device, wherein the address is mapped to an identity of the wireless device, wherein the address comprises a first part defining an identity of a local network gateway of the wireless device and a second part defining the identity of the wireless device, and wherein selection of the second part is independent from the first part and the identity of the local network gateway. The method comprises mapping the amount of data packet traffic to the identity of the wireless device. The method comprises reporting the amount of data packet traffic and information identifying at least an identity of a group of wireless devices to which the wireless device belongs to a metering entity in the communications network.

According to a second aspect there is presented a core network node for handling registration of data packet traffic for a wireless device in a communications network. The core network node comprises processing circuitry. The processing circuitry is configured to cause the core network node to register an amount of data packet traffic in the communications network for the wireless device, wherein each data packet comprises an address of the wireless device, wherein the address is mapped to an identity of the wireless device, wherein the address comprises a first part defining an identity of a local network gateway of the wireless device and a second part defining the identity of the wireless device, and wherein selection of the second part is independent from the first part and the identity of the local network gateway. The processing circuitry is configured to cause the core network node to map the amount of data packet traffic to the identity of the wireless device. The processing circuitry is configured to cause the core network node to report the amount of data packet traffic and information identifying at least an identity of a group of wireless devices to which the wireless device belongs to a metering entity in the communications network.

According to a third aspect there is presented a core network node for handling registration of data packet traffic for a wireless device in a communications network. The core network node comprises processing circuitry and a computer program product. The computer program product stores instructions that, when executed by the processing circuitry, causes the core network node to perform steps, or operations. The steps, or operations, cause the core network node to register an amount of data packet traffic in the communications network for the wireless device, wherein each data packet comprises an address of the wireless device, wherein the address is mapped to an identity of the wireless device, wherein the address comprises a first part defining an identity of a local network gateway of the wireless device and a second part defining the identity of the wireless device, and wherein selection of the second part is independent from the first part and the identity of the local network gateway. The steps, or operations, cause the core network node to map the amount of data packet traffic to the identity of the wireless device. The steps, or operations, cause the core network node to report the amount of data packet traffic and information identifying at least an identity of a group of wireless devices to which the wireless device belongs to a metering entity in the communications network.

According to a fourth aspect there is presented a core network node for handling registration of data packet traffic for a wireless device in a communications network. The core network node comprises a register module configured to register an amount of data packet traffic in the communications network for the wireless device, wherein each data packet comprises an address of the wireless device, wherein the address is mapped to an identity of the wireless device, wherein the address comprises a first part defining an identity of a local network gateway of the wireless device and a second part defining the identity of the wireless device, and wherein selection of the second part is independent from the first part and the identity of the local network gateway. The core network node comprises a map module configured to map the amount of data packet traffic to the identity of the wireless device. The core network node comprises a report module configured to report the amount of data packet traffic and information identifying at least an identity of a group of wireless devices to which the wireless device belongs to a metering entity in the communications network.

According to a fifth aspect there is presented a computer program for handling registration of data packet traffic for a wireless device in a communications network, the computer program comprising computer program code which, when run on processing circuitry of a core network node, causes the core network node to perform a method according to the first aspect.

According to a sixth aspect there is presented a method for facilitating handling of registration of data packet traffic for a wireless device in a communications network. The method is performed by a local network gateway. The method comprises receiving data packets, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the identity of the local network gateway, and wherein the identity of the wireless device enables an amount of data packet traffic in the communications network for the wireless device to be mapped to the identity of the wireless device. The method comprises obtaining a verification of the identity of the wireless device so as to establish an ownership of each of the data packets. The method comprises transmitting the data packets upon having successfully established the ownership of the data packets. The method comprises storing at least part of the address for those of the data packets for which ownership was successfully established.

According to a seventh aspect there is presented a local network gateway for facilitating handling of registration of data packet traffic for a wireless device in a communications network. The local network gateway comprises processing circuitry. The processing circuitry is configured to cause the local network gateway to receive data packets, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the identity of the local network gateway, and wherein the identity of the wireless device enables an amount of data packet traffic in the communications network for the wireless device to be mapped to the identity of the wireless device. The processing circuitry is configured to cause the local network gateway to obtain a verification of the identity of the wireless device so as to establish an ownership of each of the data packets. The processing circuitry is configured to cause the local network gateway to transmit the data packets upon having successfully established the ownership of the data packets. The processing circuitry is configured to cause the local network gateway to store at least part of the address for those of the data packets for which ownership was successfully established.

According to an eighth aspect there is presented a local network gateway for facilitating handling of registration of data packet traffic for a wireless device in a communications network. The local network gateway comprises processing circuitry and a computer program product. The computer program product stores instructions that, when executed by the processing circuitry, causes the local network gateway to perform steps, or operations. The steps, or operations, cause the local network gateway to receive data packets, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the identity of the local network gateway, and wherein the identity of the wireless device enables an amount of data packet traffic in the communications network for the wireless device to be mapped to the identity of the wireless device. The steps, or operations, cause the local network gateway to obtain a verification of the identity of the wireless device so as to establish an ownership of each of the data packets. The steps, or operations, cause the local network gateway to transmit the data packets upon having successfully established the ownership of the data packets. The steps, or operations, cause the local network gateway to store at least part of the address for those of the data packets for which ownership was successfully established.

According to a ninth aspect there is presented a local network gateway for facilitating handling of registration of data packet traffic for a wireless device in a communications network. The local network gateway comprises a receive module configured to receive data packets, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the identity of the local network gateway, and wherein the identity of the wireless device enables an amount of data packet traffic in the communications network for the wireless device to be mapped to the identity of the wireless device. The local network gateway comprises an obtain module configured to obtain a verification of the identity of the wireless device so as to establish an ownership of each of the data packets. The local network gateway comprises a transmit module configured to transmit the data packets upon having successfully established the ownership of the data packets. The local network gateway comprises a store module configured to store at least part of the address for those of the data packets for which ownership was successfully established.

According to a tenth aspect there is presented a computer program for facilitating handling of registration of data packet traffic for a wireless device in a communications network, the computer program comprising computer program code which, when run on processing circuitry of a local network gateway, causes the local network gateway to perform a method according to the sixth aspect.

According to an eleventh aspect there is presented a method for facilitating handling of registration of data packet traffic for a wireless device in a communications network. The method is performed by the wireless device. The method comprises transmitting data packets to a local network gateway, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the identity of the local network gateway, and wherein the identity of the wireless device enables an amount of data packet traffic in the communications network for the wireless device to be mapped to the identity of the wireless device.

According to a twelfth aspect there is presented a wireless device for facilitating handling of registration of data packet traffic for the wireless device in a communications network. The wireless device comprises processing circuitry. The processing circuitry is configured to cause the wireless device to transmit data packets to a local network gateway, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the identity of the local network gateway, and wherein the identity of the wireless device enables an amount of data packet traffic in the communications network for the wireless device to be mapped to the identity of the wireless device.

According to a thirteenth aspect there is presented a wireless device for facilitating handling of registration of data packet traffic for the wireless device in a communications network. The wireless device comprises processing circuitry and a computer program product. The computer program product stores instructions that, when executed by the processing circuitry, causes the wireless device to perform steps, or operations. The steps, or operations, cause the wireless device to transmit data packets to a local network gateway, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the identity of the local network gateway, and wherein the identity of the wireless device enables an amount of data packet traffic in the communications network for the wireless device to be mapped to the identity of the wireless device.

According to a fourteenth aspect there is presented a wireless device for facilitating handling of registration of data packet traffic for the wireless device in a communications network. The wireless device comprises a transmit module configured to transmit data packets to a local network gateway, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the identity of the local network gateway, and wherein the identity of the wireless device enables an amount of data packet traffic in the communications network for the wireless device to be mapped to the identity of the wireless device.

According to a fifteenth aspect there is presented a computer program for facilitating handling of registration of data packet traffic for the wireless device in a communications network, the computer program comprising computer program code which, when run on processing circuitry of a wireless device, causes the wireless device to perform a method according to the eleventh aspect.

According to a sixteenth aspect there is presented a computer program product comprising a computer program according to at least one of the fifth aspect, the tenth aspect, and the fifteenth aspect and a computer readable storage medium on which the computer program is stored. The computer readable storage medium can be a non-transitory computer readable storage medium.

Advantageously these methods, these core network nodes, these local network gateways, these wireless devices, and these computer programs provide an efficient way of distinguishing traffic from devices for different users.

Advantageously this allows securely identifying individual devices, such as IoT devices, or the owners of these devices in a network of local network gateways. The device or owner identity can then be leveraged to enable granular metering of consumed network resources and services. In particular, this granular metering can be used for granular billing. Such granular billing of traffic used by each device in a wide area network can be achieved when the local network gateway is connected to the wide area network over a cellular network.

It is to be noted that any feature of the first, second, third, fourth, fifth, sixth seventh, eight, ninth, tenth, eleventh, twelfth, thirteen, fourteenth, fifteenth and sixteenth aspects may be applied to any other aspect, wherever appropriate. Likewise, any advantage of the first aspect may equally apply to the second, third, fourth, fifth, sixth, seventh, eight, ninth, tenth, eleventh twelfth, thirteen, fourteenth, fifteenth and sixteenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. For example, the use of the IPv6 protocol is just one specific example of a protocol that can be used. Other protocols with similar characteristics as IPv6 can be utilized instead.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIGS. 2, 3, 4, 5, 6, 7, and 8 are flowcharts of methods according to embodiments;

FIG. 9 is a schematic diagram of an authentication header format;

FIG. 11 is a schematic diagram showing functional units of a core network node according to an embodiment;

FIG. 12 is a schematic diagram showing functional modules of a core network node according to an embodiment;

DETAILED DESCRIPTION

Figure 4:
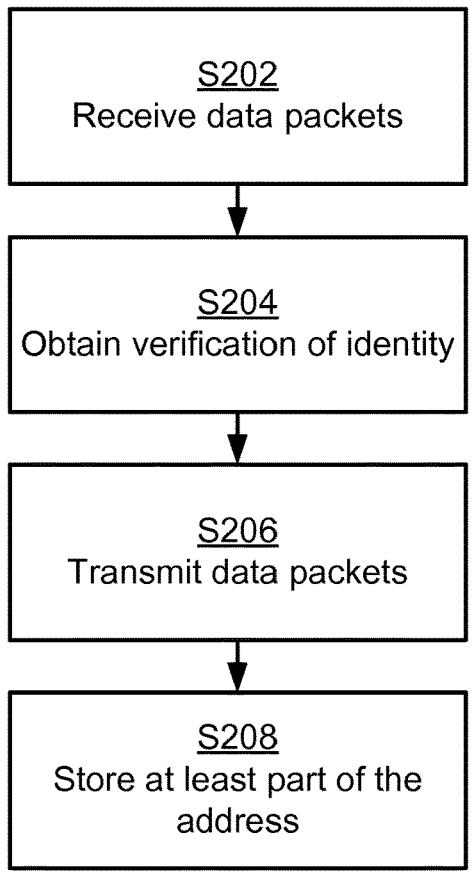

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 100 where embodiments presented herein can be applied. The communications system 100 comprises an authentication server 110, a wide area network 120 a core network 130, a radio access network 140, and a local network 160.

The core network 130 comprises at least one core network node 200 and a metering or charging entity 500. The core network node 200 could be packet data network gateway (P-GW). The metering entity 500 could comprise a Policy and Charging Control (PCC) node 510 and a metering or charging mediation entity (CME) 520. The functionality of the core network node 200 will be described below.

The radio access network 140 comprises at least one radio access network node 150. The radio access network node 150 enables a local network gateway 300 in the local network 160, to access services and exchange data as provided by the wide area network 120.

The local network gateway 300 in turn provides network access to wireless devices 400*a*-400*e*. Hence, the wireless device 400*a*-400*e* can access services and exchange data as provided by the wide area network 120 by establishing a connection to the local network gateway 300

Examples of wireless devices 400*a*-400*e* include, but are not limited to, IoT devices, machine type communication (MTC) devices, machine to machine (M2M) devices such as sensors and actuators, mobile stations, mobile phones, handsets, wireless local loop phones, user equipment (UE), smartphones, laptop computers, and tablet computers. Examples of radio access network nodes 150 include, but are not limited to, radio base stations, base transceiver stations, Node Bs, evolved Node Bs, and access points (APs).

As the skilled person understands, the communications system 100 may comprise a plurality of radio access network nodes 150, each providing network access to a plurality of local network gateway 300 in a network of local network gateway 300, and each local network gateway 300 may provide network access to a plurality of wireless devices 400*a*-400*e*. The herein disclosed embodiments are not limited to any particular number of radio access network nodes 150, local network gateways 300, or wireless devices 400*a*-400*e*.

As disclosed above, in the case of the local network gateway serving wireless devices from different users the network operator would for billing purpose like to distinguish traffic for different users such that separate billing based on the amount of data that is sent can be achieved. To charge for network access an access control mechanism is needed that controls what devices are allowed to gain network access and device identities are needed to securely identify devices (or the user of the devices). For the specific scenario described in the Background section a mapping between the charging for the local network gateway connectivity (related to the SIM card) and identity of the actual devices are needed.

The embodiments disclosed herein particularly relate to mechanisms for handling registration of data packet traffic for a wireless device 400a-400e in a communications network 100 and for facilitating handling of registration of data packet traffic for the wireless device 400a-400e in the communications network 100. In order to obtain such mechanisms there is provided a core network node 200, a method performed by the core network node 200, a computer program product comprising code, for example in the form of a computer program, that when run on processing circuitry of the core network node 200, causes the core network node 200 to perform the method. In order to obtain such mechanisms there is further provided a local network gateway 300, a method performed by the local network gateway 300, and a computer program product comprising code, for example in the form of a computer program, that when run on processing circuitry of the local network gateway 300, causes the local network gateway 300 to perform the method. In order to obtain such mechanisms there is further provided a wireless device 400a-400e, a method performed by the wireless device 400a-400e, and a computer program product comprising code, for example in the form of a computer program, that when run on processing circuitry of the wireless device 400a-400e, causes the wireless device 400a-400e to perform the method.

Figure 5:
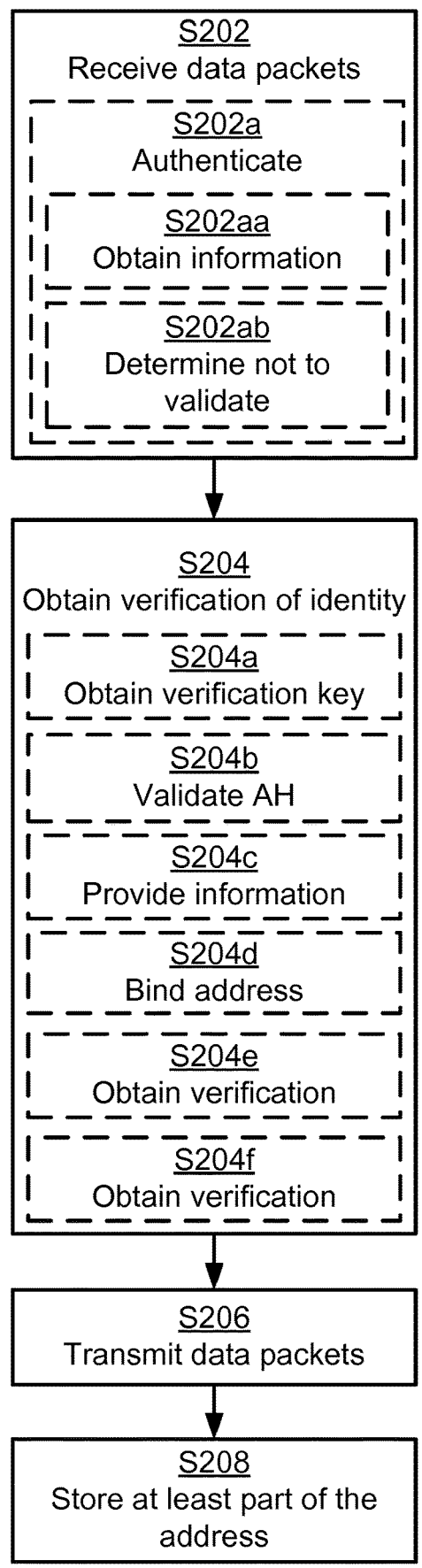

FIGS. 2 and 3 are flow charts illustrating embodiments of methods for handling registration of data packet traffic for a wireless device 400a-400e in a communications network 100 as performed by the core network node 200. FIGS. 4 and 5 are flow charts illustrating embodiments of methods for facilitating handling of registration of data packet traffic for a wireless device 400a-400e in a communications network 100 as performed by the local network gateway 300. FIGS. 6 and 7 are flow charts illustrating embodiments of methods for facilitating handling of registration of data packet traffic for a wireless device 400a-400e in a communications network 100 as performed by the wireless device 400a-400e. The methods are advantageously provided as computer programs.

The embodiments presented below handle both the scenario when a user provides a network of local network gateways and offers network access to other users and the scenario where a mobile network operator provides the network of local network gateways and offers network access for a set of users. In the first case the user may also have outsourced the complete management of the network of local network gateways and connectivity to the MNO.

According to at least some of the embodiments the devices select their address in such a way that it can be mapped to an identity for which the device can cryptographically prove the ownership for in a mobile network scenario. The local network gateway can enforce this selection by either checking the proof of ownership or waiting for the core network node to check the ownership and acting accordingly. The identity can be the device identity or the identity of the user of the device. Once the mapping from an identity to address has been confirmed, the core network node can use the address as an identifier for differential treatment and metering of data. In the billing or metering system the mapping between the identity linked to the device and the identity of the local network gateway (e.g. a SIM card) can be performed when needed.

Reference is now made to FIG. 2 illustrating a method for handling registration of data packet traffic for a wireless device 400a-400e in a communications network 100 as performed by the core network node 200 according to an embodiment.

S102: The core network node 200 registers an amount of data packet traffic in the communications network for the wireless device. In this sense the core network node 200 can be considered to keep a record of the amount of data packet traffic in the communications network for the wireless device that passes through the core network node 200. Each data packet comprises an address of the wireless device. The address is mapped to an identity of the wireless device. The address comprises a first part defining an identity of a local network gateway 300 of the wireless device. The address comprises a second part defining the identity of the wireless device. Selection of the second part is independent from the first part and the identity of the local network gateway. This enables information needed to verify the ownership of the wireless device to be provisioned to the core network node 200 without the core network node 200 knowing the address of a local network gateway of the wireless device. The wireless device can connect to any local network gateway to configure the address of the wireless device, without that affecting the possibility for the core network node 200 to verify the ownership of the wireless device. There are different examples of first and second parts. For example, the first part can occur prior to the second part, or vice versa. Alternatively the first part and the second part are interleaved. Further examples of the first part and the second part will be provided below.

S104: The core network node 200 maps the amount of data packet traffic to the identity of the wireless device.

S106: The core network node 200 reports the amount of data packet traffic and information identifying at least an identity of a group of wireless devices to which the wireless device belongs to a metering entity 500 in the communications network.

Embodiments relating to further details of handling registration of data packet traffic for a wireless device 400a-400e in a communications network 100 as performed by the core network node 200 will now be disclosed.

There may be different ways to define the first part and the second part of the address. According to some aspects the second part of the address in turn has two sub-parts; a first sub-part being an identity of a group of wireless devices, and a second sub-part defining a unique identity of an individual wireless device in the group. Thus, according to an embodiment the second part comprises a first sub-part defining the identity of a group of wireless devices to which the wireless device belongs, and a second sub-part defining the identity of the wireless device within the group of wireless devices. The second sub-part could be a MAC address of the wireless device, or a hash of a public key, where the public key is unique for the wireless device. In this respect, the first sub-part could be an empty string where the second sub-part is a hash of a public key.

Further, according to an embodiment the first part is a prefix and the second part is a suffix. Still further, the address could be an IP address, such as an IPv6 address. Thus, the first part of the address could be IPv6 address prefix and the second part of the address could be IPv6 address suffix.

There may be different ways for the core network node to report the information identifying at least an identity of a group of wireless devices to which the wireless device belongs to the metering entity. According to some aspects the core network node signals the user identity directly, or information (such as a device public key) identifying an entry in a device database from where the metering entity can extract the user identity. Particularly, according to an embodiment the information identifying the identity of the group of wireless devices to which the wireless device belongs is the identity of the wireless device itself, the identity of the group of wireless devices to which the wireless device belongs, or information identifying a database entry, such as a public key of the wireless device.

Reference is now made to FIG. 3 illustrating methods for handling registration of data packet traffic for a wireless device 400a-400e in a communications network 100 as performed by the core network node 200 according to further embodiments. It is assumed that steps S102, S104 are performed as disclosed above and a thus repeated description thereof is therefore omitted.

According to some aspects at least one of the data packets comprises an authentication header. Hence, according to an embodiment the core network node is configured to map the amount of data packet traffic to the identity of the wireless device by performing steps S104a, S104b:

S104a: The core network node 200 obtains a verification key of the wireless device from a database using the identity of the wireless device.

S104b: The core network node 200 validates the authentication header using the verification key.

The core network node can be configured to obtain the verification key by using a, possibly truncated, hash of the public key of the wireless device, where the public key is unique for the wireless device. That is, a truncated hash of the device public key can be used as input to search the database to obtain the device public key that is used in the verification. Note that, although unlikely, there can be many such keys that have the same truncated hash. How to handle this will be disclosed below.

Further, when the wireless device sends its first data packet, the wireless device could include therein an Internet Protocol Security (IPsec) authentication header (AH) and uses its symmetric key to integrity protect the data packet. Thus, according to an embodiment the authentication header is an IPsec AH. At least one of the data packets can then be integrity protected using a symmetric key of the wireless device or a private key of the wireless device. The AH could comprise a Security Parameter Index (SPI) that indicates that the AH is for charging purposes.

The validation in step S104b can be either successful or unsuccessful. In general terms, step S106 is only performed when the validation in step S104b (if step S104b is performed) is successful. According to an embodiment the core network node is configured to perform step S108 when the validation in step S104b is unsuccessful:

S108: The core network node 200 notifies a local network gateway 300 of the wireless device to block data packets comprising the address of the wireless device.

Reference is now made to FIG. 4 illustrating a method for facilitating handling of registration of data packet traffic for a wireless device 400a-400e in a communications network 100 as performed by the local network gateway 300 according to an embodiment.

S202: The local network gateway 300 receives data packets. As noted above, each data packet comprises an address of the wireless device. The address is mapped to an identity of the wireless device. The address comprises a first part defining an identity of the local network gateway and a second part defining the identity of the wireless device. Selection of the second part is independent from the identity of the local network gateway. The identity of the wireless device enables an amount of data packet traffic in the communications network for the wireless device to be mapped to the identity of the wireless device.

S204: The local network gateway 300 obtains a verification of the identity of the wireless device so as to establish an ownership of each of the data packets.

S206: The local network gateway 300 transmits the data packets upon having successfully established the ownership of the data packets.

S208: The local network gateway 300 stores at least part of the address for those of the data packets for which ownership was successfully established.

Embodiments relating to further details of facilitating handling of registration of data packet traffic for a wireless device 400a-400e in a communications network 100 as performed by the local network gateway 300 will now be disclosed. Aspects and embodiments of the core network node 200 as described above also apply to the local network gateway 300, mutatis mutandis, and a thus repeated description thereof is therefore omitted.

For example at least one of the data packets comprises an authentication header, and the verification to establish ownership of the data packets with the authentication header can be obtained from the core network node 200 signalling back to the local network gateway 300 in case a packet is failing the verification (see, step S108 above).

Reference is now made to FIG. 5 illustrating methods for facilitating handling of registration of data packet traffic for a wireless device 400a-400e in a communications network 100 as performed by the local network gateway 300 according to further embodiments. It is assumed that steps S202, S204, S206, and S208 are performed as disclosed above and a thus repeated description thereof is therefore omitted.

As noted above, at least one of the data packets can comprise an authentication header. In such cases the local network gateway can be configured to verify the authentication header by performing steps S204a, S204b as part of obtaining the verification of the identity of the wireless device in step S204:

S204a: The local network gateway 300 obtains a verification key of the wireless device from a database using the identity of the wireless device. The verification key could be a public key of the wireless device or a symmetric key.

S204b: The local network gateway 300 validates the authentication header using the verification key.

The local network gateway 300 could then signal to the core network node the user identifier or what device public key was used in the successful verification. Hence, according to an embodiment the local network gateway is configured to verify the authentication header by performing step S204c as part of obtaining the verification of the identity of the wireless device in step S204:

S204c: The local network gateway 300 provides the core network node 200 with information identifying the identity of the wireless device upon having successfully validated the authentication header. The information identifying the identity of the wireless device is then information identifying a database entry, such as a public key of the wireless device. In this respect, as was disclosed above with reference to the core network node, when the wireless device sends its first data packet, the wireless device could include therein an Internet Protocol Security (IPsec) authentication header (AH) and uses its symmetric key to integrity protect the data packet. Thus, according to an embodiment the authentication header is an IPsec AH. At least one of the data packets can then be integrity protected using a symmetric key of the wireless device or a private key of the wireless device. The AH could comprise a Security Parameter Index (SPI) that indicates that the AH is for charging purposes.

The local network gateway 300 could check ownership of the wireless devices by itself by linking a valid address to a secured MAC layer session and only accept the address of the wireless device if the data packets comprising the address are sent within this MAC layer session. This is independent of if the verification of the identity linked to the address was performed by the core network node or by the local network gateway itself. Hence, the local network gateway 300 can be configured to perform step S204*d* as part of obtaining the verification of the identity of the wireless device in step S204:

S204*d*: The local network gateway 300 binds the address to a secured communication at a different protocol layer than the IP layer between the wireless device and the local network gateway.

S204*f*: The local network gateway 300 obtains a verification to establish ownership of subsequently received data packets comprising an already stored address through the secured communication without requiring any authentication header of these subsequently received data packets. The secured communication can be established at the MAC layer, below the protocol layer on which the data packets are sent. The communication at the MAC layer can be secured by at least one of encrypting and integrity protecting the data packets at the MAC layer.

In this respect, the binding in step S204*d* can be performed upon successful verification of an AH where the local network gateway 300 maps the address to a MAC layer session and then stores that information (as in S208). The verification step S204*f* can be performed on subsequent data packets (without the binding in step S204*d* being performed), replacing steps S204*a*, S204*b*, and S204*c*.

The local network gateway could authenticate each wireless device when the wireless device connects to the local network gateway in order to establish MAC layer security. Hence, according to an embodiment where communications using MAC layer security is used between the wireless device and the local network gateway, the local network gateway is configured to perform step S202*a* as part of step S202:

S202*a*: The local network gateway 300 authenticates the wireless device as part of establishing secure communication at the MAC layer.

The authentication of the wireless device can be made by the local network gateway itself or with the help of an authentication server. If the local network gateway performs the authentication it needs access to a database of device credentials for use in the authentication. If the local network gateway obtains information from the credential database or from the authentication server about which user the device belongs to, then the authentication header can be skipped completely (i.e., also for the first data packet). Hence according to an embodiment the local network gateway is configured to perform steps S202*aa* and S202*ab* as part of step S202*a* in order to authenticate the wireless device:

S202*aa*: The local network gateway 300 obtains information about the identity of the wireless device from a credential database or the authentication server.

S202*ab*: The local network gateway 300 determines not to validate any authentication header comprised in the data packets.

Further, when an IP address is used in a given MAC layer session that is not already listed as accepted, the user information from the IP address suffix could be matched against the user information tagged to the MAC layer session to check if the IP address is valid. Hence according to an embodiment the local network gateway is configured to perform step S204*e* as part of step S204 when one of the data packets is a first occurring data packet comprising the address of the wireless device:

S204*e*: The local network gateway 300 obtains a verification of the identity of the wireless device so as to establish ownership of at least the first data packet through MAC layer security and by verifying that the identity information obtained from the address matches the identity information of the wireless devices obtained from the authentication server.

Reference is now made to FIG. 6 illustrating a method for facilitating handling of registration of data packet traffic for a wireless device 400*a*-400*e* in a communications network 100 as performed by the wireless device 400*a*-400*e* according to an embodiment.

S304: The wireless device 400*a*-400*e* transmits data packets to a local network gateway 300. As noted above, each data packet comprises an address of the wireless device. The address is mapped to an identity of the wireless device. The address comprises a first part defining an identity of a local network gateway 300 of the wireless device and a second part defining the identity of the wireless device. Selection of the second part is independent from the identity of the local network gateway. The identity of the wireless device enables an amount of data packet traffic in the communications network for the wireless device to be mapped to the identity of the wireless device.

Embodiments relating to further details of facilitating handling of registration of data packet traffic for a wireless device 400*a*-400*e* in a communications network 100 as performed by the wireless device 400*a*-400*e* will now be disclosed. Aspects and embodiments of the core network node 200 and the local network gateway 300 as described above also apply to the wireless device 400*a*-400*e*, mutatis mutandis, and a thus repeated description thereof is therefore omitted.

For example, as disclosed above, the wireless device could select an IPv6 address suffix in such a way that it can be mapped to an identity for which the wireless device can cryptographically prove the ownership.

For example, as disclosed above, at least a first of the data packets transmitted by the wireless device comprises an authentication header. For example, as disclosed above, the authentication header could be an IPsec AH, and the at least one of the data packets could be integrity protected using a symmetric key of the wireless device or a private key of the wireless device. The AH could comprise a SPI that indicates that the AH is for charging purposes. Verification of the AH can be performed either at the local network gateway or by the core network node.

Reference is now made to FIG. 7 illustrating methods for facilitating handling of registration of data packet traffic for a wireless device 400*a*-400*e* in a communications network 100 as performed by the wireless device 400*a*-400*e* according to further embodiments. It is assumed that step S304 is performed as disclosed above and a thus repeated description thereof is therefore omitted The wireless device can be configured to obtain information for use in proof of ownership of the wireless device. Hence, according to an embodiment the wireless device 400*a*-400*e* is configured to perform steps S302*a*, S302*c*, S302*d*:

S302*a*: The wireless device 400*a*-400*e* obtains at least one of information identifying the identity of the wireless device and information on how to derive the address of the wireless device.

S302*c*: The wireless device 400*a*-400*e* obtains the first part of the address that defines the identity of the local network gateway.

S302d: The wireless device 400a-400e derives the address of the wireless device based on the obtained information and the first part of the address.

Steps S302a, S302c, S302d are performed prior to step S304.

The information identifying the device could be at least one of the address, or part of the address, of the wireless device, a private key unique to the wireless device, a public key unique to the wireless device, a hash of a public key unique of the wireless, and a symmetric key valid at least for the wireless device.

The information identifying the device and information on how to derive the address of the wireless device could be obtained during a bootstrap procedure of the wireless device. The IPsec AH can thus by the wireless device be used for bootstrapping the association of address to identity.

According to an embodiment secure communication between the wireless device and the local network gateway is established at the MAC protocol layer, below a protocol layer on which the data packets are sent. The communication at the MAC protocol layer could then be secured by at least one of encrypting and integrity protecting the data packets at the MAC protocol layer. For this purpose the wireless device 400a-400e could be configured to perform step S302b:

S302b: The wireless device 400a-400e executes an authenticating protocol as part of establishing secure communication at the MAC layer.

Step S302b is performed after step S302a and before step S302d.

Embodiments common for the core network node 200, the local network gateway 300, and the wireless device 400a-400e will now be disclosed.

According to an embodiment the device has a user unique identity. According to this embodiment each device belonging to a given user can be provisioned with a user unique identifier and a symmetric key unique for the user. The IPv6 address suffix is chosen by the device as the user unique identifier concatenated with a device unique identifier truncated to suitable number of bits. Such a device unique identifier can be the MAC address of the device or the hash of the device unique public key if such exists. By choosing the IPv6 address suffix in this way the IP address can be used in the wide area network to identify the user whilst still being unique for each device within the subnet of devices connected to the local network gateway (i.e., the subnet of devices behind the local network gateway). For example, the latter 64 bits, the so called Interface Identifier, of the IPv6 address could be used as the user unique identity where the first 32 bits identifies the user and the remaining 32 bits are unique for each device (for a given user). This part of the IP address is only relevant within the subnet behind the local network gateway and not part of the routing of packets performed in the wide area network. In the unlikely event of collisions the local network gateway will indicate to the device to change address in which it can simply add 1 to the device unique part of the address seen as a number (i.e., the user related part of the address must not change).

According to this embodiment, when a device sends its first IP packet, it includes there an IPsec AH and uses its symmetric key to integrity protect the IP packet. The integrity checksum is stored as an Integrity Check Value (ICV) at the end of the AH. FIG. 9 schematically illustrates an AH format 900 according to an embodiment. The Security Parameter Index (SPI) in the AH could be set to a specific value that indicates to the local network gateway and/or the core network node that the AH is for billing purpose. According to the embodiment of FIG. 9 the AH comprises a next header field, a payload length field, a RESERVED field, an SPI field, a sequence number field, an ICV (variable) field.

If the user identifier obtained from the IPv6 address is known to the local network gateway, meaning the local network gateway has access to the corresponding symmetric key, the local network gateway can verify the integrity of the IP packet and by this conclude if the device with the given IP address belongs to the user or not. If the user identifier is not known, the local network gateway can forward the packet to the core network node. In the latter case the core network node verifies the integrity of the IP packet. If the verification fails the core network node can return an error message to the local network gateway (e.g., using Internet Control Message Protocol (ICMP) message). If the local network gateway, either independently or with help from the core network node, concludes that the integrity verification failed, the local network gateway blocks any future messages with the corresponding IP address. If the verification is successful the local network gateway lists the IP address as a valid IP address and accepts future packets with that IP address from this device and forwards them to the core network node. Accepting future packets may here involve successfully verifying the AH for each of the packets or relying on the MAC layer security (if such is available) and filtering at this layer. In the latter case when the devices notice that its packets are delivered end-to-end, it can stop using the AH in subsequent packets. The MAC layer filtering is described in more detail below.

When a packet with IPv6 address comprising a user identifier is routed through the core network the core network can implement billing control for each packet based on the embedded user identifier. This is further described below.

Instead of using filtering at the IP layer through the use of AH protection MAC layer security, if available, can be used between the devices and the local network gateway to prevent devices from user A from using an accepted IP address of user B when sending its own data packets and by this put the billing costs on user B. MAC layer security commonly involves encryption of the traffic sent on the link layer but may also include integrity protection. Independently if only encryption is used and/or integrity protection, the local network gateway could link a valid IP address to a secured MAC layer session and only accept the IP address if sent within this MAC layer session. As long as unique MAC layer keys are used per device or group of devices belonging to the same user, it is not possible for a device of user A to generate a valid MAC layer message corresponding to a device of user B. The above is an example of where a logical control agent at the IP layer instructs a logical filter agent at the MAC layer to perform filtering based on IP layer parameters and the filtering at the IP layer may be removed or at least relaxed.

In general terms, MAC layer security works to protect against attacks as described above as long as the all devices communicates directly with the local network gateway. Assume that the network topology is such that devices communicate via other devices to reach the local network gateway (so-called multi-hop communication in a mesh network). If the local network gateway is part of several mesh networks belonging to different users, where in each mesh network all devices belongs to the same user, then the local network gateway needs in the filtering at the MAC layer to accept several valid IP addresses per MAC layer association for the embodiments described above to still be secure.

If there is no MAC layer security used by the local network gateway or the network topology is such that devices belonging to one user need to send packets via devices from other users to reach the local network gateway, then filtering may not be performed at the MAC layer and it can be necessary for all devices to protect each IP packet it sends with an AH as described above and the local network gateway or the core network node could be configured to validate the AH of each packet. If the core network node performs the validation, the local network gateway does not need to be trusted by the core network node.

In general terms, most MAC layer security mechanisms involve sequence numbers on packets which protect against replay of messages. Hence, it is not possible for a rogue device to simply record messages from another device and send them again causing the user of the device to be charged for more data than what was sent. In the scenario described above where there is no MAC layer security or network topology is such that MAC layer security cannot be utilized and each IP packet is sent with an AH, it can be up to communications at the AH layer to prevent replay. In AH there is a sequence counter that prevents replay attacks. This counter is a 32-bit value that starts at 1 and increase for every packet.

When connecting to a local network gateway with MAC layer security each device can be authenticated by the local network gateway. An Extensible Authentication Protocol method is commonly used where an Authentication Server (AS) performs the authentication on behalf of the local network gateway. If the local network gateway is implemented such that it obtains information from the authentication server about which user the joining device belongs to, then the IPSec Authentication Header can be skipped completely (also for the first packet). Instead, as soon as an IP address is used in a given MAC layer session that is not already listed as accepted, the user information from the IP address suffix can be matched against the user information tagged to the MAC layer session to check if the IP address is valid. In this case even the part deciding on what IP address should be accepted is pushed down from the IP layer to the MAC layer.

The present embodiment without the use of AH could represent a scenario where the user providing the local network gateway handles the re-sell of connectivity. This user needs to have means to authenticate the wireless devices which can be linked to the user of the wireless device. When the MNO is running a network of local network gateways and sells connectivity the Authentication Server typically is part of the mobile network and could retrieve information about the owner of each wireless device. When a user provides the local network gateway but has outsourced the re-sell of connectivity to an MNO there might be several Authentication Servers used for authenticating the wireless devices. The user may have its own Authentication Server for its own wireless devices and for other wireless devices an Authentication Server of the operator can be used for the authentication.

According to an embodiment the wireless device has a device unique identity. This avoids provisioning of user identifiers and shared secrets for the user. Instead the wireless device can be provisioned with a device unique public-private key pair. This device unique public-private key pair can be reused for network metering and billing purpose. Such a key pair can be used for secure communication between the wireless device and servers for wireless device management and data reporting. The Constrained Application Protocol (CoAP) which is utilized in the Lightweight Machine to Machine (LwM2M) protocol mandates the support for 256-bit elliptic curve cryptography (ECC) key pairs for securing communication between two CoAP endpoints (e.g. wireless device and a data server).

According to this embodiment the IPv6 address suffix can be chosen by the wireless device as the wireless device identifier truncated to a suitable number of bits, where the wireless device identifier is the hash of the wireless device public key. As described above for user unique billing identities, the latter 64 bits of the IPv6 address could be used to identify the wireless device. Although very unlikely, it might happen that two wireless devices within the same subnet have the same truncated wireless device identifier. Since the IP address must be unique for the local network gateway to be able to uniquely route packets to the correct node within the subnet behind the local gateway, one or two bits out of the available bits could be reserved to only be used for resolving collisions.

The present embodiment is similar to the previously described embodiment for user unique identities with exceptions that will now be listed.

First, the wireless device uses its private key to generate a signature over the IP packet and includes the signature in the Integrity Check Value (ICV) at the end of the AH.

Second, the core network node is provisioned with the public keys of all wireless devices for which it offers network connectivity. They are stored in a database together with the hash of the public key truncated to the same number of bits as used by the wireless device inside the IPv6 address suffix. The database could further comprise an identifier of the user of the wireless device, which is needed for the purpose of billing.

Third, the core network node could keep a list of accepted IP addresses and the mapping to the user identifier used for billing (or other information to locate the correct entry in the database of wireless device public keys). For each IP packet received the core network node could check that the IP address is in the list of accepted addresses.

Fourth, when the core network node receives an AH protected IP packet the core network node verifies the AH using the signature (ICV) of the AH. Even if unlikely, there can be several public keys that result in the same truncated hash as obtained from the IP address. Hence, the suffix of the IPv6 address may be identical for two wireless devices but the prefix of the IPv6 address is then different. In this case all public keys with that truncated hash in the database are tried in the verification of the AH. When the correct public key is found the IP address can be linked to the correct user identifier and the list of accepted IP addresses can be updated. The verification of the AH could be performed by the local network gateway instead of the core network node but then the local network gateway may signal to the core network node the user identifier or what wireless device public key was used in the successful verification for the network to update in the list of accepted IP addresses.

Fifth, similarly to what was described above, the IPSec Authentication Header can be skipped completely for all packets if the local network gateway has received information about the wireless device public key of the joining wireless device during the authentication to the local network gateway at the MAC layer which may very well be the case if it is used in the authentication. From this public key the local network gateway can obtain the identifier of the user of the wireless device from the database of wireless device public keys. For example, an authentication server (AS) aiding the local network gateway in the authentication of wireless devices may provide this information. The local network gateway could then within the given MAC layer session accept other IP addresses with suffix containing a truncated hash that has the same user as the one corresponding to the public key of the joining wireless device. This could require the local network gateway to be able to query the database with mappings of truncated hashes and user identities.

Further, as described above, if there is no MAC layer security used by the local network gateway, or the network topology is such that wireless devices belonging to one user needs to send packets via wireless devices from other users to reach the local network gateway, then it could be necessary for all wireless devices to protect each IP packet it sends with an AH as described above and the local network gateway or the core network node should validate the AH of each packet. When the ICV value is a digital signature computed by a public-key algorithm it can be advantageous for performance reasons to modify the algorithm for the ICV such that it only uses the public-key algorithm for the first message(s) and for the subsequent messages use a symmetric key based algorithm. This is illustrated in the flowchart of FIG. 8, the steps of which are performed by the wireless device 400a-400e:

S401: A data packet is read.

S402: It is checked whether the packet number is ≤K, where K is an integer. If yes, then step S403 is performed, and if no, then step S404 is performed.

S403: The ICV is determined using a public-key algorithm.

S404: The ICV is determined using a symmetric-key algorithm

S405: The ICV is delivered.

The symmetric key described above may for example be a session key that is selected by the verifying entity (local network gateway or core network node) and delivered securely to the device upon successful verification of the first packet using the public key.

However this can be generalized to more complex schemes where the ICV is inserted at mutually agreed places and possibly also under control of a session key so an opponent may not know in advance where the ICVs will be inserted.

Before the embodiment where the wireless device has a user unique identity and the embodiment where the wireless device has a device unique identity can be utilized, the wireless device, the local network gateway, and the core network node could be provisioned with suitable credentials. There are many ways in which the wireless device, the local network gateway, and the core network node can be provisioned e.g. depending on the type of wireless device.

In terms of provisioning of the local network gateway and/or the core network node, the user or the network operator that is providing connectivity could generate a user unique identifier for use when the user registers with the network. During the registration the user can supply the symmetric key or public keys (together with its wireless device identity) used for verification of the wireless devices. In the case when device unique public-private key pairs are used the user could be enabled to modify (add/remove) wireless device credentials to. The user could obtain the public keys for the wireless devices on some electronic media (e.g. a Compact Disc, SD Card, or equivalent) from the manufacturer of the wireless devices.

For the provisioning of the wireless devices, the wireless devices can be pre-configured from the manufacturing phase, the user may use manual configuration if such is supported by the wireless device, or the wireless device could connect to a bootstrapping server used by the user for provisioning of wireless device credentials. Further, the local network gateway and/or the core network node can be configured to enable the wireless device to pre-register, which means the wireless device could get free network access during a short period of time such that the wireless device can connect to a bootstrap server and download the needed credentials for network access. The user could pre-configure the bootstrapping server with the credentials needed for provisioning all wireless devices. For example, the OMA LwM2M protocol can be used for provisioning of wireless device credentials. During wireless device bootstrapping the wireless device could be instructed in which way the IPv6 address suffix should be created. This information could additionally or alternatively be supplied by the local network gateway and/or the core network node if only one way is supported by the local network gateway and/or the core network node. For the user unique network address case the user unique identifier and the symmetric key are also provided to the wireless device. The credentials for MAC layer security could also be provided if MAC layer security is used.

The core network node and keeps track of the traffic used by each local network gateway as well as the traffic used by each wireless device connected to the local network gateways. This information is then transferred in metering and charging data records to a metering entity 500, such as a charging mediation function, in the communications network, as in step S106. The metering entity can then create a set of complete billing specifications for the different users involved. For example, in the scenario described in the Backgrounds section, billing specifications can be created for users A, B, and C where the bill to user A for the local network gateway subscriptions could be reduced with the amount of data consumed by wireless devices belonging to users B and C. The MNO could also handle billing to users B and C on behalf of user A. Charging could also be different based on location of the local network gateways, etc.

Figure 10:
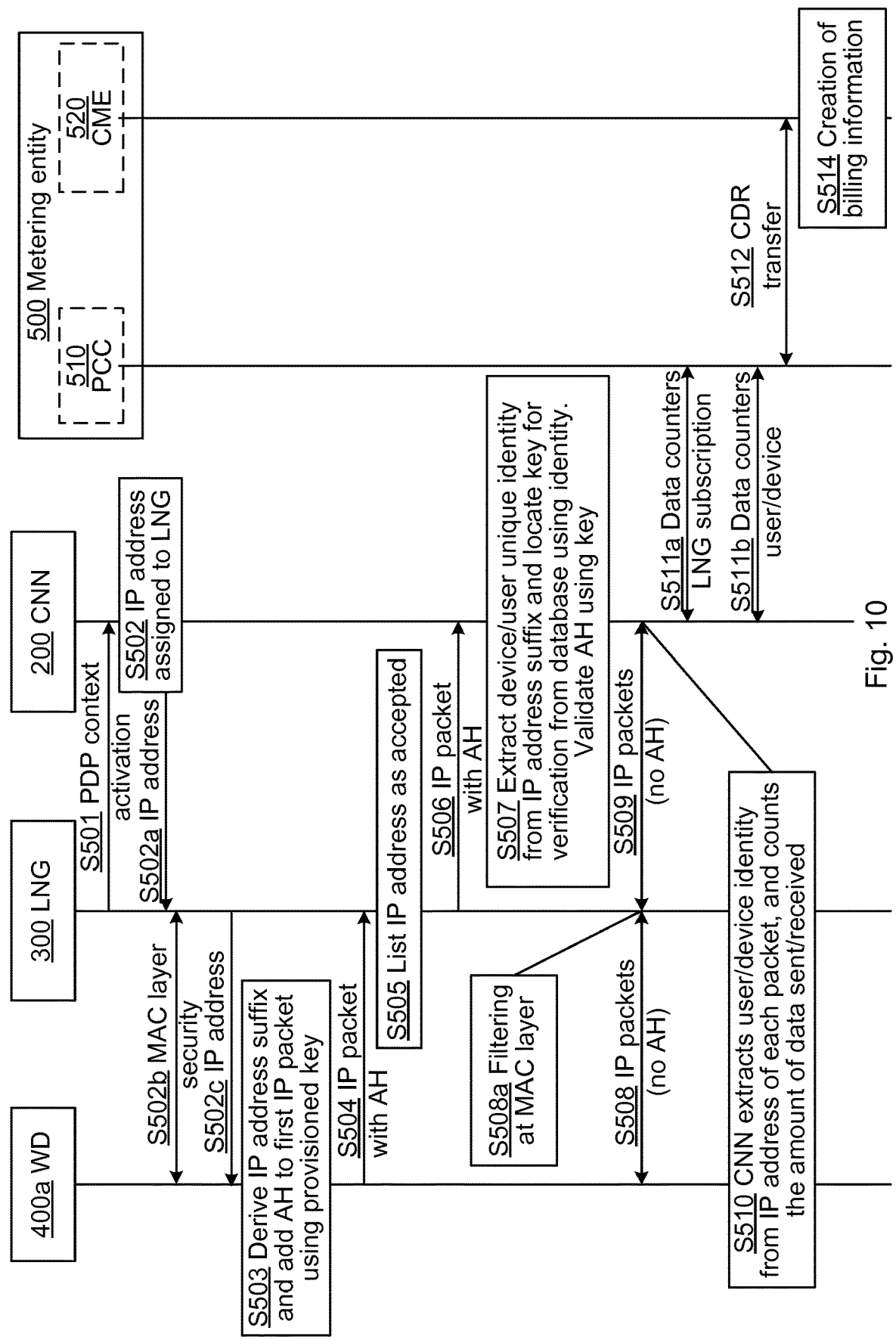
FIG. 10 is a signalling diagram according to an embodiment.

FIG. 10 is a signalling diagram according to an embodiment. The embodiment disclosed in FIG. 10 is based on at least some of the embodiments presented above with reference to the flowcharts of FIGS. 2-8.

S501: The local network gateway (LNG) 200 sends a packet data protocol (PDP) context activation to the core network node (CNN) 200.

S502: In response to the received PDP context activation received from the local network gateway, the core network node assigns an IP address to the local network gateway.

S502a: The local network gateway IP address is delivered to the local network gateway.

S502b: A MAC layer security session is established between the wireless device and the local network gateway.

S502c: The local network gateway IP address is delivered to the wireless device.

S503: The wireless device (WD) 400a derives an IP address suffix and adds to its first data packet to be transmitted an AH using a provisioned key.

S504: The wireless device transmits the data packet comprising the AH to the local network gateway.

S505: Once having received the data packet from the wireless device, the local network gateway verifies the address of the wireless devices and upon success verification lists the address of the wireless device as accepted.

S506: The local network gateway forwards the data packet comprising the AH to the core network node.

S507: The core network node extract either a device or a user unique identity from the IP address suffix and locates a key for verification from a database using the identity. The core network node validates the AH using the key. If the validation is unsuccessful, an error signal is provided to the local network gateway to block the IP address.

S508: Data packets (possibly without AH) are sent between the wireless device and the local network gateway.

S508a: Filtering is performed by the local network gateway at the MAC layer based on accepted IP addresses.

S509: The data packets (possibly without AH) are further sent between the local network gateway and the core network node.

Steps S508, S508a, and S509 can be repeated as long as there are data packets to be sent.

S510: The core network node extracts the user identity or device identity from the IP address of each data packet, and counts the amount of data sent/received.

S511a: The core network node signals data counters, the amount of data sent/received, and the identity of the local network gateway to the PCC node 510 of the metering entity 500.

S511b: The core network node signals data counters, the amount of data sent/received, and the identity of the user or wireless device to the PCC node 510 of the metering entity 500.

By means of steps S511a and S511b the core network node can thus signal billing information to the PCC both for data sent by the local network gateway itself and billing information based on a user identity or a device identity for data sent by the wireless devices. Thus for the use of device unique network billing identity the device identity can be sent from the core network node to the PCC node. Instead of the device identity it may also be the wireless device public key or any other information identifying an entry in the wireless device database from where PCC can extract the user identity that is sent. Another option is that the core network node signals the user identity directly, meaning that the PCC node does not need to access the device database.

S512: The PCC node collects the data counters, the amount of data sent/received, and the identity of the user to be billed in a charging data record (CDR), and provides the CDR to the CME 520 of the metering entity.

S513: The CME creates billing information for the involved users.

FIG. 11 schematically illustrates, in terms of a number of functional units, the components of a core network node 200 according to an embodiment. As noted above, the core network node 200 could be a packet data network gateway. Processing circuitry 210 is provided using any combination of one or more of a suitable central processing unit (CPU), multiprocessor, microcontroller, digital signal processor (DSP), etc., capable of executing software instructions stored in a computer program product 1710a (as in FIG. 17), e.g. in the form of a storage medium 230. The processing circuitry 210 may further be provided as at least one application specific integrated circuit (ASIC), or field programmable gate array (FPGA).

Particularly, the processing circuitry 210 is configured to cause the core network node 200 to perform a set of operations, or steps, S102-S108, as disclosed above. For example, the storage medium 230 may store the set of operations, and the processing circuitry 210 may be configured to retrieve the set of operations from the storage medium 230 to cause the core network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The core network node 200 may further comprise a communications interface 220 for communications at least with a local network gateway 300, a metering entity 500, and wireless devices 400a-400e. As such the communications interface 220 may comprise one or more transmitters and receivers, comprising analogue and digital components and a suitable number of antennas for wireless communications and ports for wireline communications.

The processing circuitry 210 controls the general operation of the core network node 200 e.g. by sending data and control signals to the communications interface 220 and the storage medium 230, by receiving data and reports from the communications interface 220, and by retrieving data and instructions from the storage medium 230. Other components, as well as the related functionality, of the core network node 200 are omitted in order not to obscure the concepts presented herein.

FIG. 12 schematically illustrates, in terms of a number of functional modules, the components of a core network node 200 according to an embodiment. The core network node 200 of FIG. 12 comprises a number of functional modules; a register module 210a configured to perform step S102, a map module 210b configured to perform step S104, and a report module 210C configured to perform step S106. The core network node 200 of FIG. 12 may further comprise a number of optional functional modules, such as any of an obtain module 210d configured to perform step S104a, a validate module 210e configured to perform step S104b, and a notify module 210f configured to perform step S108. In general terms, each functional module 210a-210f may be implemented in hardware or in software. Preferably, one or more or all functional modules 210a-210f may be implemented by the processing circuitry 210, possibly in cooperation with functional units 220 and/or 230. The processing circuitry 210 may thus be arranged to from the storage medium 230 fetch instructions as provided by a functional module 210a-210f and to execute these instructions, thereby performing any steps of the core network node 200 as disclosed herein.

Figure 13:
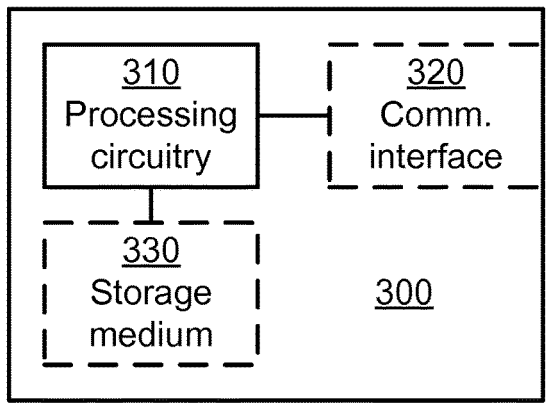
FIG. 13 is a schematic diagram showing functional units of a local network gateway according to an embodiment.

FIG. 13 schematically illustrates, in terms of a number of functional units, the components of a local network gateway 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1710b (as in FIG. 17), e.g. in the form of a storage medium 330. The processing circuitry 310 may further be provided as at least one application specific integrated circuit (ASIC), or field programmable gate array (FPGA).

Particularly, the processing circuitry 310 is configured to cause the local network gateway 300 to perform a set of operations, or steps, S202-S208, as disclosed above. For example, the storage medium 330 may store the set of operations, and the processing circuitry 310 may be configured to retrieve the set of operations from the storage medium 330 to cause the local network gateway 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The local network gateway 300 may further comprise a communications interface 320 for communications at least with a core network node 200 and wireless devices 400a-400e. As such the communications interface 320 may comprise one or more transmitters and receivers, comprising analogue and digital components and a suitable number of antennas for wireless communications and ports for wireline communications.

The processing circuitry 310 controls the general operation of the local network gateway 300 e.g. by sending data and control signals to the communications interface 320 and the storage medium 330, by receiving data and reports from the communications interface 320, and by retrieving data and instructions from the storage medium 330. Other components, as well as the related functionality, of the local network gateway 300 are omitted in order not to obscure the concepts presented herein.

Figure 14:
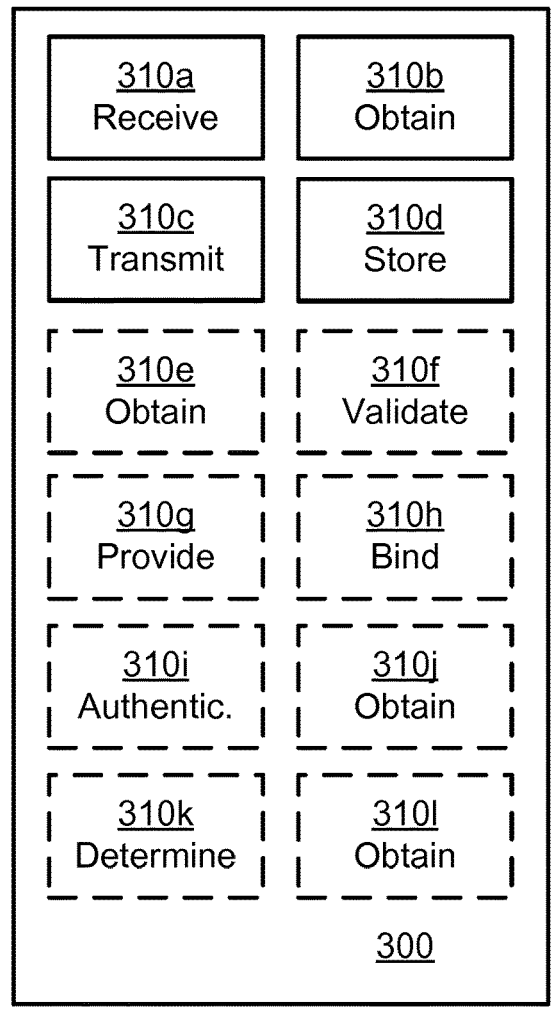
FIG. 14 is a schematic diagram showing functional modules of a local network gateway according to an embodiment.

FIG. 14 schematically illustrates, in terms of a number of functional modules, the components of a local network gateway 300 according to an embodiment. The local network gateway 300 of FIG. 14 comprises a number of functional modules; a receive module 310a configured to perform step S202, an obtain module 310b configured to perform step S204, a transmit module 310c configured to perform step S206, and a store module 310d configured to perform step S208. The local network gateway 300 of FIG. 14 may further comprises a number of optional functional modules, such as any of an obtain module 310e configured to perform step S204a, a validate module 310f configured to perform step S204b, a provide module 310g configured to perform step S204c, a bind module 310h configured to perform step S204d, an authentication module 310i configured to perform step S202a, an obtain module 310j configured to perform step S202aa, a determine module 310k configured to perform step S202ab, and an obtain module 310l configured to perform step S204e. In general terms, each functional module 310a-310l may be implemented in hardware or in software. Preferably, one or more or all functional modules 310a-310l may be implemented by the processing circuitry 310, possibly in cooperation with functional units 320 and/or 330. The processing circuitry 310 may thus be arranged to from the storage medium 330 fetch instructions as provided by a functional module 310a-310l and to execute these instructions, thereby performing any steps of the local network gateway 300 as disclosed herein.

Figure 15:
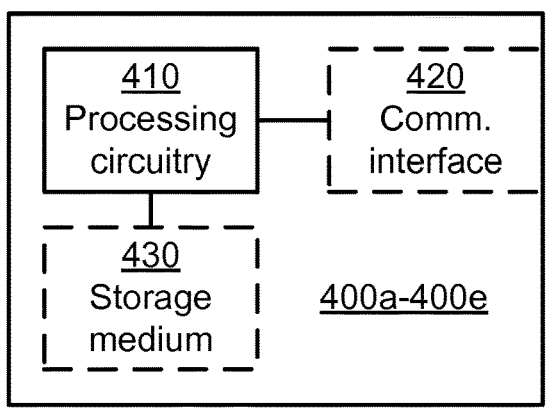
FIG. 15 is a schematic diagram showing functional units of a wireless device according to an embodiment.

FIG. 15 schematically illustrates, in terms of a number of functional units, the components of a wireless device 400a-400e according to an embodiment. The wireless device 400a-400e could a constrained device, such as an Internet of Things device, or a machine type communications (MTC) device.

Processing circuitry 410 is provided using any combination of one or more of a suitable central processing unit (CPU), multiprocessor, microcontroller, digital signal processor (DSP), etc., capable of executing software instructions stored in a computer program product 410c (as in FIG. 17), e.g. in the form of a storage medium 430. The processing circuitry 410 may further be provided as at least one application specific integrated circuit (ASIC), or field programmable gate array (FPGA).

Particularly, the processing circuitry 410 is configured to cause the wireless device 400a-400e to perform a set of operations, or steps, S302-S304, as disclosed above. For example, the storage medium 430 may store the set of operations, and the processing circuitry 410 may be configured to retrieve the set of operations from the storage medium 430 to cause the wireless device 400a-400e to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 400a-400e may further comprise a communications interface 420 for communications at least with a core network node 200 and a local network gateway 300. As such the communications interface 420 may comprise one or more transmitters and receivers, comprising analogue and digital components and a suitable number of antennas for wireless communications and ports for wireline communications.

The processing circuitry 410 controls the general operation of the wireless device 400a-400e e.g. by sending data and control signals to the communications interface 420 and the storage medium 430, by receiving data and reports from the communications interface 420, and by retrieving data and instructions from the storage medium 430. Other components, as well as the related functionality, of the wireless device 400a-400e are omitted in order not to obscure the concepts presented herein.

Figure 16:
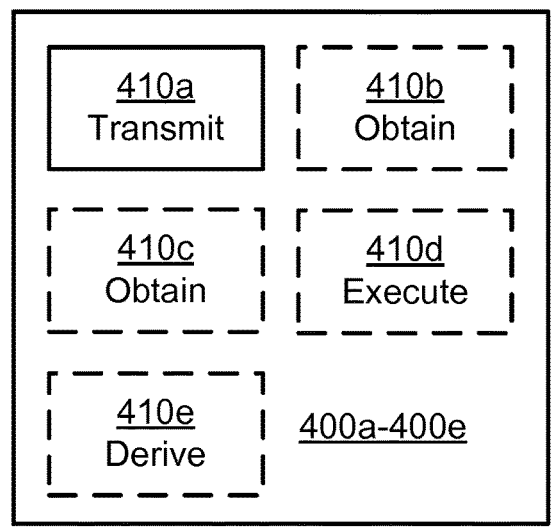
FIG. 16 is a schematic diagram showing functional modules of a wireless device according to an embodiment.

FIG. 16 schematically illustrates, in terms of a number of functional modules, the components of a wireless device 400a-400e according to an embodiment. The wireless device 400a-400e of FIG. 16 comprises a transmit module 410a configured to perform step S304. The wireless device 400a-400e of FIG. 16 may further comprises a number of optional functional modules, such as any of an obtain module 410b configured to perform step S302a, an obtain module 410c configured to perform step S302c, an execute module 410d configured to perform step S302b, and a derive module 410e configured to perform step S302d. In general terms, each functional module 410a-410e may be implemented in hardware or in software. Preferably, one or more or all functional modules 410a-410e may be implemented by the processing circuitry 410, possibly in cooperation with functional units 420 and/or 430. The processing circuitry 410 may thus be arranged to from the storage medium 430 fetch instructions as provided by a functional module 410a-410e and to execute these instructions, thereby performing any steps of the wireless device 400a-400e as disclosed herein.

Figure 17:
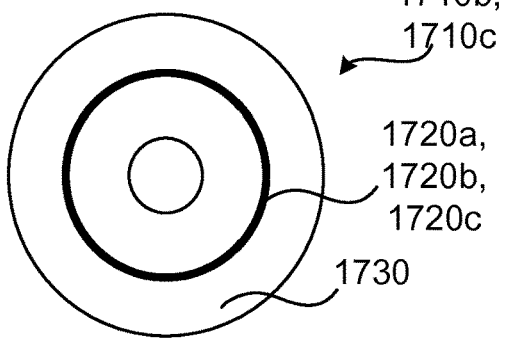
FIG. 17 shows one example of a computer program product comprising computer readable means according to an embodiment.

FIG. 17 shows one example of a computer program product 1710a, 1710b comprising computer readable means 1730. On this computer readable means 1730, a computer program 1720a can be stored, which computer program 1720a can cause the processing circuitry 210 and thereto operatively coupled entities and devices, such as the communications interface 220 and the storage medium 230, to execute methods according to embodiments described herein. The computer program 1720a and/or computer program product 1710a may thus provide means for performing any steps of the core network node 200 as herein disclosed. On this computer readable means 1730, a computer program 1720b can be stored, which computer program 1720b can cause the processing circuitry 310 and thereto operatively coupled entities and devices, such as the communications interface 320 and the storage medium 330, to execute methods according to embodiments described herein. The computer program 1720*b* and/or computer program product 1710*b* may thus provide means for performing any steps of the local network gateway 300 as herein disclosed. On this computer readable means 1730, a computer program 1720*c* can be stored, which computer program 1720*c* can cause the processing circuitry 410 and thereto operatively coupled entities and devices, such as the communications interface 420 and the storage medium 430, to execute methods according to embodiments described herein. The computer program 1720*c* and/or computer program product 1710*c* may thus provide means for performing any steps of the wireless device 400*a*-400*e* as herein disclosed.

In the example of FIG. 17, the computer program product 1710*a*, 1710*b*, 1710*c* is illustrated as an optical disc, such as a CD (compact disc) or a DVD (digital versatile disc) or a Blu-Ray disc. The computer program product 1710*a*, 171*a*, 1710*c* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1720*a*, 1720*b*, 1720*c* is here schematically shown as a track on the depicted optical disk, the computer program 1720*a*, 1720*b*, 1720*c* can be stored in any way which is suitable for the computer program product 1710*a*, 1710*b*, 1710*c*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method performed by a core network node for handling registration of data packet traffic for a wireless device in a communications network, the method comprising:
   registering the data packet traffic in the communications network for the wireless device, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the first part defining the identity of the local network gateway, wherein the second part comprises a first sub-part defining an identity of a group of wireless device to which the wireless device belongs, and a second sub-part defining the identity of the wireless device within the group of wireless devices, wherein the second sub-part is a hash of a public key, the public key being unique for the wireless device, and wherein at least one of data packets comprises an authentication header, wherein the authentication header is an Internet Protocol Security (IPsec) Authentication Header (AH), wherein the at least one of the data packets is integrity protected using a symmetric key of the wireless device or a private key of the wireless device, and wherein the AH comprises a Security Parameter Index (SPI) that indicates that the AH is for charging purposes;
   mapping the registered of data packet traffic to the identity of the wireless device;
   obtaining a verification key of the wireless device from a database using the identity of the wireless device; and
   reporting the mapped data packet traffic and information identifying at least the identity of the group of wireless devices to which the wireless device belongs to a metering entity in the communications network.

2. The method of claim 1:
   wherein the first part is a prefix and the second part is a suffix; and
   wherein the address is an Internet Protocol (IP) address.

3. The method of claim 1:
   wherein the information identifying at least the identity of the group of wireless devices to which the wireless device belongs is the identity of the wireless device itself, the identity of the group of wireless devices to which the wireless device belongs, or information identifying a database entry.

4. The method of claim 1:
   wherein the method further comprises:
   validating the authentication header using the verification key.

5. The method of claim 4, further comprising, in response to the validating being unsuccessful, notifying the local network gateway of the wireless device to block the data packets comprising the address of the wireless device.

6. A method performed by a local network gateway to facilitate registration of data packet traffic for a wireless device in a communications network, the method comprising:
   receiving data packets, wherein each data packet comprises an address of the wireless device, wherein the address is mapped to an identity of the wireless device, wherein the address comprises a first part defining an identity of the local network gateway and a second part defining the identity of the wireless device, wherein selection of the second part is independent from the identity of the local network gateway, wherein the identity of the wireless device enables the data packet traffic in the communications network for the wireless device to be mapped to the identity of the wireless device, wherein the second part comprises a first sub-part defining an identity of a group of wireless device to which the wireless device belongs, and a second sub-part defining the identity of the wireless device within the group of wireless devices, wherein the second sub-part is a hash of a public key, the public key being unique for the wireless device, and wherein at least one of the data packets comprises an authentication header, wherein the authentication header is an Internet Protocol Security (IPsec) Authentication Header (AH), wherein the at least one of the data packets is integrity protected using a symmetric key of the wireless device or a private key of the wireless device, and wherein the AH comprises a Security Parameter Index (SPI) that indicates that the AH is for charging purposes;
   obtaining a verification of the identity of the wireless device to establish an ownership of each of the data packets;
   obtaining a verification key of the wireless device from a database using the identity of the wireless device;
   transmitting the data packets upon having successfully established the ownership of the data packets; and
   storing at least part of the address for those of the data packets for which the ownership was successfully established.

7. The method of claim 6:
wherein the verification is obtained from a core network node signaling back to the local network gateway in case a data packet is failing the verification.

8. The method of claim 6:
wherein the method further comprises:
validating the authentication header using the verification key.

9. The method of claim 6, wherein the obtaining the verification comprises:
binding the address to a secured communication at a different protocol layer than Internet Protocol layer between the wireless device and the local network gateway; and
wherein verification to establish ownership of subsequently received data packets comprising an already stored address is obtained through the secured communication without requiring any authentication header of the subsequently received data packets.

10. The method of claim 8, further comprising:
providing a core network node with information identifying the identity of the wireless device upon having successfully validated the authentication header,
wherein the information identifying the identity of the wireless device is information identifying a database entry, such as a public key of the wireless device.

11. A method performed by a wireless device to facilitate registration of data packet traffic for the wireless device in a communications network, the method comprising:
transmitting data packets to a local network gateway, wherein each data packet comprises an address of the wireless device, wherein the address is mapped to an identity of the wireless device, wherein the address comprises a first part defining an identity of the local network gateway of the wireless device and a second part defining the identity of the wireless device, wherein selection of the second part is independent from the identity of the local network gateway, wherein the second part comprises a first sub-part defining an identity of a group of wireless device to which the wireless device belongs, and a second sub-part defining the identity of the wireless device within a group of wireless devices, wherein the second sub-part is a hash of a public key, the public key being unique for the wireless device, wherein the local network gateway obtains a verification key of the wireless device from a database using the identity of the wireless device wherein the identity of the wireless device enables the data packet traffic in the communications network for the wireless device to be mapped to the identity of the wireless device, and wherein at least one of the data packets transmitted by the wireless device comprises an authentication header, wherein the authentication header is an Internet Protocol Security (IPsec) Authentication Header (AH), wherein the at least one of the data packets is integrity protected using a symmetric key of the wireless device or a private key of the wireless device, and wherein the AH comprises a Security Parameter Index (SPI) that indicates that the AH is for charging purposes.

12. The method of claim 11, further comprising:
obtaining at least one of information identifying the identity of the wireless device and information to derive the address of the wireless device;
obtaining the first part defining the identity of the local network gateway; and
deriving the address of the wireless device based on the obtained information and the first part.

13. A core network node for registration of data packet traffic for a wireless device in a communications network, the core network node comprising:
processing circuitry; and
memory containing instructions executable by the processing circuitry whereby the core network node is operative to:
register the data packet traffic in the communications network for the wireless device, wherein each data packet comprises an address of the wireless device, wherein the address is mapped to an identity of the wireless device, wherein the address comprises a first part defining an identity of a local network gateway of the wireless device and a second part defining the identity of the wireless device, wherein selection of the second part is independent from the first part defining the identity of the local network gateway, wherein the second part comprises a first sub-part defining an identity of a group of wireless devices to which the wireless device belongs, and a second sub-part defining the identity of the wireless device within a group of wireless device, wherein the second sub-part is a hash of a public key, the public key being unique for the wireless device, and wherein at least one of data packets comprises an authentication header, wherein the authentication header is an Internet Protocol Security (IPsec) Authentication Header (AH), wherein the at least one of the data packets is integrity protected using a symmetric key of the wireless device or a private key of the wireless device, and wherein the AH comprises a Security Parameter Index (SPI) that indicates that the AH is for charging purposes;
map the registered data packet traffic to the identity of the wireless device;
obtain a verification key of the wireless device from a database by use of the identity of the wireless device; and
report the mapped data packet traffic and information identifying at least an identity of a group of wireless devices to which the wireless device belongs to a metering entity in the communications network.

14. A local network gateway to facilitate registration of data packet traffic for a wireless device in a communications network, the local network gateway comprising:
processing circuitry; and
memory containing instructions executable by the processing circuitry whereby the local network gateway is operative to:
receive data packets, wherein each data packet comprises an address of the wireless device, wherein the address is mapped to an identity of the wireless device, wherein the address comprises a first part defining an identity of the local network gateway and a second part defining the identity of the wireless device, wherein selection of the second part is independent from the identity of the local network gateway, wherein the second part comprises a first sub-part defining an identity of a group of wireless devices to which the wireless device belongs, and a second sub-part defining the identity of the wireless device within a group of wireless devices, wherein the second sub-part is a hash of a public key, the public key being unique for the wireless device, wherein the identity of the wireless device enables the data packet traffic in the communications network for the wireless device to be mapped to the identity of the wireless device, and wherein at least one of the data packets comprises an authentication header, wherein the authentication header is an Internet Protocol Security (IPsec) Authentication Header (AH), wherein the at least one of the data packets is integrity protected using a symmetric key of the wireless device or a private key of the wireless device, and wherein the AH comprises a Security Parameter Index (SPI) that indicates that the AH is for charging purposes;

obtain a verification of the identity of the wireless device to establish an ownership of each of the data packets;

obtain a verification key of the wireless device from a database by use of the identity of the wireless device;

transmit the data packets upon having successfully established the ownership of the data packets; and store at least part of the address for those of the data packets for which ownership was successfully established.

15. A wireless device to facilitate registration of data packet traffic for the wireless device in a communications network, the wireless device comprising:

processing circuitry; and memory containing instructions executable by the processing circuitry whereby the wireless device is operative to:

transmit data packets to a local network gateway, wherein each data packet comprises an address of the wireless device, wherein the address is mapped to an identity of the wireless device, wherein the address comprises a first part defining an identity of the local network gateway of the wireless device and a second part defining the identity of the wireless device, wherein selection of the second part is independent from the identity of the local network gateway, wherein the second part comprises a first sub-part defining an identity of a group of wireless devices to which the wireless device belongs, and second sub-part defining the identity of the wireless device within the group of wireless devices, wherein the second sub-part is a hash of a public key, the public key being unique for the wireless device, wherein the local network gateway obtains a verification key of the wireless device from a database by use of the identity of the wireless device, wherein the identity of the wireless device enables data packet traffic in the communications network for the wireless device to be mapped to the identity of the wireless device, and wherein at least one of the data packets transmitted by the wireless device comprises an authentication header, wherein the authentication header is an Internet Protocol Security (IPsec) Authentication Header (AH), wherein the at least one of the data packets is integrity protected using a symmetric key of the wireless device or a private key of the wireless device, and wherein the AH comprises a Security Parameter Index (SPI) that indicates that the AH is for charging purposes.

* * * * *